(12) United States Patent
Kurfiss

(10) Patent No.: US 10,793,249 B2
(45) Date of Patent: Oct. 6, 2020

(54) AIRCRAFT HAVING A THERMAL INSULATION COMPONENT

(71) Applicant: Airbus Defence and Space GmbH, Taufkirchen (DE)

(72) Inventor: Florian Kurfiss, Sauerlach (DE)

(73) Assignee: AIRBUS DEFENCE AND SPACE GMBH, Taufkirchen (DE)

( * ) Notice: Subject to any disclaimer, the term of this patent is extended or adjusted under 35 U.S.C. 154(b) by 201 days.

(21) Appl. No.: 15/978,530

(22) Filed: May 14, 2018

(65) Prior Publication Data

US 2018/0257758 A1    Sep. 13, 2018

Related U.S. Application Data

(63) Continuation of application No. PCT/EP2016/077829, filed on Nov. 16, 2016.

(30) Foreign Application Priority Data

Nov. 16, 2015 (DE) .................. 10 2015 222 528

(51) Int. Cl.
| | | |
|---|---|---|
| *B64C 1/40* | (2006.01) | |
| *B64G 1/58* | (2006.01) | |
| *B64B 1/40* | (2006.01) | |
| *B64C 39/02* | (2006.01) | |
| *B64G 1/10* | (2006.01) | |

(52) U.S. Cl.
CPC .............. *B64C 1/40* (2013.01); *B64G 1/58* (2013.01); *B64B 1/40* (2013.01); *B64C 39/024* (2013.01); *B64G 1/10* (2013.01)

(58) Field of Classification Search
CPC ................ B64C 1/40; B64C 1/58; B64C 1/38
See application file for complete search history.

(56) References Cited

U.S. PATENT DOCUMENTS

| | | | |
|---|---|---|---|
| 3,055,831 A * | 9/1962 | Barnett | .................. C04B 30/02 |
| | | | 252/62 |
| 5,154,373 A | 10/1992 | Scott | |
| 7,977,411 B2 | 7/2011 | Williams et al. | |
| 9,365,279 B2 | 6/2016 | Joern | |
| 2003/0066932 A1* | 4/2003 | Carroll | .................. B64C 39/028 |
| | | | 244/120 |

(Continued)

FOREIGN PATENT DOCUMENTS

| | | |
|---|---|---|
| DE | 102012001912 | 6/2013 |
| DE | 102012013977 | 1/2014 |

(Continued)

OTHER PUBLICATIONS

International Search Report, dated Jan. 17, 2017, priority document.

(Continued)

*Primary Examiner* — Richard G Davis

(74) *Attorney, Agent, or Firm* — Greer, Burns & Crain, Ltd.

(57) ABSTRACT

An aircraft comprises at least one thermal insulation component, which is made of a nano-porous material, the pore structure of which is open-pored such that when the aircraft is in flight operation, a pressure in the pores of the thermal insulation component corresponds to the ambient pressure at the flight altitude of the aircraft.

5 Claims, 1 Drawing Sheet

(56) References Cited

U.S. PATENT DOCUMENTS

2014/0093751 A1* 4/2014 Schaefer ............ H01M 2/1072
429/7
2015/0299889 A1  10/2015 Mertens et al.
2018/0358668 A1* 12/2018 Doege ................. H01M 2/1094

FOREIGN PATENT DOCUMENTS

| DE | 102012013977 A1 | 1/2014 |
|----|---|---|
| JP | H02102894 A | 4/1990 |
| RU | 2466906 C2 | 11/2012 |

OTHER PUBLICATIONS

"Polymer/Carbon-Based Hybrid aerogels: Preparation, Properties and Applications", Lizeng zuo et al., Oct. 9, 2015.
Zuo, et al., "Polymer/Carbon-Based Hybrid Aerogels: Preparation, Properties and Applications" MDPI, 2015.

\* cited by examiner

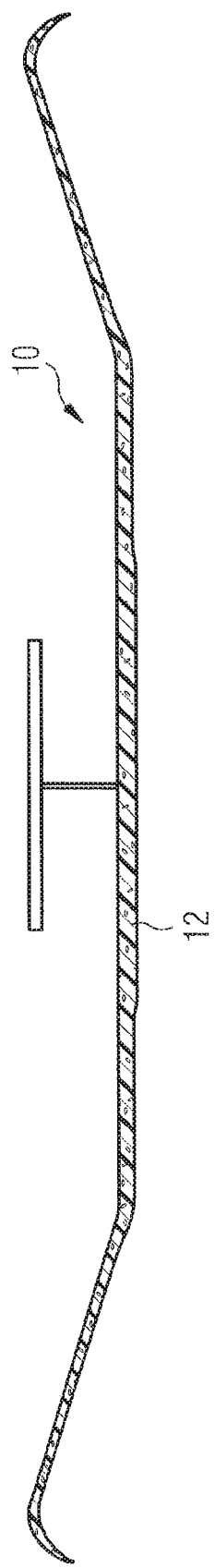

AIRCRAFT HAVING A THERMAL INSULATION COMPONENT

CROSS-REFERENCES TO RELATED APPLICATIONS

This application is a continuation of International Application PCT/EP2016/077829 filed Nov. 16, 2016, designating the United States and published on May 26, 2017 as WO 2017/085107. This application also claims the benefit of the German patent application No. 10 2015 222 528.3 filed on Nov. 16, 2015. The entire disclosures of the above are incorporated herein by way of reference.

BACKGROUND OF THE INVENTION

The present invention relates to an aircraft having a thermal insulation component. The invention further relates to a method for operating such an aircraft.

Aircraft that are suitable for operating at very great altitudes—for example, above 15,000 m—must be equipped with lightweight insulation components that save installation space, yet are very efficient at the same time, in order to protect components sensitive to temperature, such as electronic components, for example, in particular avionics components, from the low temperatures of down to −90° C. that prevail at great altitudes. Foamed insulation components of polystyrene or similar, reflective foils or vacuum insulation panels filled with granulates, such as, e.g., aerogel granulates, are currently installed in HAPS (High Altitude Pseudo Satellites).

SUMMARY OF THE INVENTION

An object of the present invention is to provide an aircraft with a thermal insulation component that is optimized in terms of weight and at the same time in terms of performance. Another object of the invention is to specify a method for operating such an aircraft.

An aircraft comprises at least one thermal insulation component, which comprises a nano-porous material, the pore structure of which is designed to be open-pored so that when the aircraft is in flight operation, a pressure in the pores of the thermal insulation component corresponds to the ambient pressure at the flight altitude of the aircraft.

While heat conduction in air is dominated by convection at normal atmospheric pressure at sea level, at lower pressures thermal radiation also comes increasingly to the fore as a heat conduction mechanism. At pressures of between 10 and 100 mBar, the proportions in overall heat conduction of heat conduction due to convection and heat conduction due to thermal radiation are roughly the same. At pressures <1 mBar the thermal radiation is the definitive heat conduction mechanism. The heat conductivity of nano-porous materials is determined substantially by the heat conduction of the gas present in the pores of these materials. The heat conduction of this gas is a function for its part of the ratio between the mean free path length of the gas molecules and the mean pore diameter.

In particular, an increase in the ratio between the mean free path length of the gas molecules and the mean pore diameter in a nano-porous material results in a reduction in the heat conduction of the gas, as the gas molecules then collide increasingly more often with the pore walls than with other gas molecules and thus transmit their thermal energy increasingly to the solid phase of the nano-porous material. An increase in the ratio between the mean free path length of the gas molecules and the mean pore diameter can be caused by a reduction in the pressure of the gas in the pores of the nano-porous material.

Unlike in the case of known vacuum insulation panels, in which, to realize low thermal conductivities, granulates contained in the interior of the panels are artificially evacuated and are then sealed in relation to the ambient atmosphere by suitable outer envelopes, in the thermal insulation component of the aircraft the ambient pressure at the flight altitude of the aircraft, which pressure is significantly below the normal atmospheric pressure at sea level, is used to reduce the pressure of the gas in the pores of the nano-porous material and thereby the heat conduction of this gas. The thermal insulation component therefore has optimized insulation properties for an application at reduced ambient pressure without it being necessary to artificially produce a pressure in the insulation component that is reduced compared with the normal atmospheric pressure at sea level and then to seal the insulation component relative to the ambient atmosphere.

An outer envelope for sealing the insulation component relative to the ambient atmosphere can therefore be eliminated in the case of the thermal insulation component. The insulation component can consequently be designed to be particularly lightweight. Furthermore, damage events, which are caused in conventional vacuum insulation panels by mechanical damage to the outer envelope, can be avoided. Finally, the thermal insulation component is impervious to pressure variations in the ambient atmosphere, as it is guaranteed by the structure of the insulation component and in particular its open porosity that a pressure equalization always takes place between the ambient atmosphere and the interior of the insulation component. The thermal insulation component can therefore not only be used at altitudes of above 20,000 m, where conventional vacuum insulation panels fail on account of the residual pressure remaining in their interior in spite of artificial evacuation and subsequent sealing, as the panels swell on account of the pressure difference between the residual pressure present in their interior and the low pressure of the ambient atmosphere. On the contrary, the thermal insulation component can even be used in aircraft such as planetary probes, for example, which after a long residence time in a vacuum re-enter the atmosphere of a planet or moon and land there, i.e., are to remain in its atmosphere.

The thermal insulation component of the aircraft preferably contains an aerogel. Aerogels are distinguished by their low weight and their nano-porous structure with open pores, which permits a pressure equalization between the ambient atmosphere and the gas in the interior of the pores of the aerogel. The aerogel may contain a solid fraction, for example, of a maximum of 10 percent by volume. Moreover, in silica aerogels even the solid phase has a comparatively low thermal conductivity.

In a particularly preferred embodiment of the aircraft, the thermal insulation component contains a polymer aerogel. Polymer aerogels are produced, for example, by adding a cross-linking agent, which is covalently bonded with hydroxyl groups, to a silica gel before it is dried. Polymer aerogels are distinguished by outstanding mechanical properties and, in particular, by a low brittleness and thus good deformability. For example, Airloy® X130 UL can be used to produce the thermal insulation component. The thermal insulation component can then be brought into the form suitable for its purpose on board the aircraft easily and without damaging the insulation component and can be fitted in the aircraft.

In a preferred embodiment of the aircraft, a solid phase material of the thermal insulation component is non-transparent in the infrared wavelength range. The emission of heat by the solid phase of the thermal insulation component can thereby be reduced and the insulation properties of the insulation component consequently improved.

The thermal insulation component may form a battery insulation of the aircraft, for example. However, it is also conceivable to install the thermal insulation component at other points in the aircraft. Installation of the thermal insulation component is generally conceivable anywhere on board the aircraft where the loss of heat energy is to be prevented.

The aircraft equipped with the thermal insulation component may be a HAPS, a weather balloon, a HALE UAV (High Altitude Long Endurance Unmanned Aerial Vehicle), a manned aircraft, a stratospheric balloon, a planetary probe or similar. It is only essential that the aircraft is suitable for operation at altitudes at which such a reduced ambient pressure prevails compared with the normal atmospheric pressure at sea level, in which ambient pressure the thermal insulation component has the thermal insulation properties required for the specific application on board the aircraft.

In a method for operating an aircraft, which is equipped with at least one thermal insulation component, which comprises a nano-porous material with an open-pored structure, a pressure in the pores of the thermal insulation component when the aircraft is in flight operation corresponds to the ambient pressure at the flight altitude of the aircraft.

The thermal insulation component may contain an aerogel, in particular a polymer aerogel. A solid phase material of the thermal insulation component is preferably non-transparent in the infrared wavelength range.

A preferred embodiment of the invention is now explained in greater detail with reference to the enclosed schematic drawing, wherein

BRIEF DESCRIPTION OF THE DRAWINGS

The FIGURE shows a schematic view of an aircraft equipped with a thermal insulation component.

DETAILED DESCRIPTION OF THE PREFERRED EMBODIMENTS

The FIGURE shows an aircraft 10, in which a thermal insulation component 12 is installed as battery insulation. The aircraft 10 shown in the FIGURE is a HAPS, which is suitable for operation at a flight altitude of over 15,000 m. Alternatively to this, however, the aircraft 10 can also be formed as a weather balloon, HALE UAV, manned aircraft, stratospheric balloon, planetary probe or similar.

The thermal insulation component 12 comprises a nano-porous material, the pore structure of which is open-pored so that when the aircraft 10 is in flight operation, a pressure in the pores of the thermal insulation component 12 corresponds to the ambient pressure at the flight altitude of the aircraft 10. In particular, the thermal insulation component 12 comprises a polymer aerogel, such as Airloy® X130 UL, for example.

As can be seen from the following table, the insulation capacity of the thermal insulation component 12 already exceeds the insulation capacity of a conventional vacuum insulation panel above an altitude of 13,716 m. As the flight altitude increases, the insulation capacity gains even increase compared with the conventional vacuum insulation panel.

| Flight altitude/ pressure | | Conventional vacuum insulation panel | Insulation component of Airloy ® X130 UL | Change in % |
|---|---|---|---|---|
| 13,716 m/130 mbar | Temperature difference inside/outside | 110° C. | | |
| | Heat flow | 4.84 W | 4.59 W | −5.2% |
| 18,288 m/70 mbar | Temperature difference inside/outside | 100° C. | | |
| | Heat flow | 2.44 W | 2.16 W | −11.5% |
| 24,383 m/30 mbar | Temperature difference inside/outside | 90° C. | | |
| | Heat flow | 1.14 W | 0.98 W | −21.9% |

At the same time, on account of the elimination of a pressure-tight outer envelope, the thermal insulation component 12 has a weight that is 41% lower than the conventional vacuum insulation panel at 165 g compared with 280 g.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft with at least one thermal insulation component comprising a nano-porous polymer aerogel without a pressure-tight outer envelope, a pore structure of which is open-pored such that when the aircraft is in flight operation, a pressure in the pores of the thermal insulation component corresponds to the ambient pressure at a flight altitude of the aircraft,
   wherein the aircraft is a HAPS, a weather balloon, a HALE UAV, a manned aircraft, a stratospheric balloon or a planetary probe.

2. The aircraft according to claim 1, wherein a solid phase material of the thermal insulation component is non-transparent in an infrared wavelength range.

3. The aircraft according to claim 1, wherein the at least one thermal insulation component forms a battery insulation.

4. A method for operating an aircraft, which is equipped with at least one thermal insulation component, comprising the step, when the aircraft is in flight operation,
   providing at least one thermal insulation component comprising a nano-porous polymer aerogel without a pressure-tight outer envelope, a pore structure of which is open-pored such that when the aircraft is in flight operation, a pressure in the pores of the thermal insulation component corresponds to the ambient pressure at a flight altitude of the aircraft;

maintaining the open-pored structure during flight wherein a pressure in pores of the thermal insulation component equalizes to the ambient pressure at the flight altitude of the aircraft, wherein the aircraft is a HAPS, a weather balloon, a HALE UAV, a manned aircraft, a stratospheric balloon or a planetary probe.

5. The method according to claim 4, wherein a solid phase material of the thermal insulation component is non-transparent in an infrared wavelength range.

\* \* \* \* \*